: # 2,739,958

DYEABLE NITROGEN-CONTAINING POLYESTERS

James Lincoln and Kathleen Mary Hammond, London, and Walter Henry Groombridge, Spondon, near Derby, England, assignors to British Celanese Limited, a corporation of Great Britain No Drawing. Application May 12, 1953, Serial No. 354,644

Claims priority, application Great Britain May 21, 1952

2 Claims. (Cl. 260—75)

This invention relates to improvements in the production of polymers and is more particularly concerned with the production of fibre-forming polymers having an affinity for dyestuffs.

In recent years a number of high-melting aromatic linear polyesters have been developed suitable for the manufacture of artificial filaments and fibres. Such polymers have, for example, been produced from terephthalic acid and polymethylene glycols or xylylene glycol or bis-$\beta$-oxyethyl derivatives of certain diphenols, e. g. 1.4-bis-oxyethoxy-benzene (cf. U. S. Application S. No. 281,474 filed April 9, 1952), from diphenyl-4,4'-dicarboxylic acid or $\alpha.\omega$-bis-(4-carboxyphenyl)-alkanes and polymethylene or other glycols, for example ethylene and propylene glycol, and from $\alpha.\omega$-bis-(para-carboxyphenoxy)-alkanes and glycols, both straight chain and branched chain, from 1.5-, 2.6- and 2.7-naphthalene dicarboxylic acids and the same glycols, and from various other dicarboxylic acids containing one or more benzene rings and appropriate glycols. Again, high-melting polyesters may be produced from certain diphenols and aliphatic dicarboxylic acids. Such phenols include hydroquinone and its simple nuclear substitution products. For example, hydroquinone and adipic acid yield a polymer having a melting point of 224–226° C. while hydroquinone and succinic acid produce a polymer having a melting point as high as 300° C. The polyesterification in the case of such diphenols is best carried out by using the diphenol in the form of its diacetate or by using it together with acetic anhydride. Again high-melting polyesters may be produced from 4-hydroxyethyl benzoic acid or from 4-hydroxyethoxy-benzoic acid or its 3-methyl or 3-chloro derivatives.

All these high-melting aromatic crystalline polyesters are produced from raw materials in which the hydroxy group or the carboxy group is directly linked to an aromatic nucleus and in which the two reactive groups in the same polymer-forming component are linked to the aromatic nucleus or nuclei so that the linkages are separated by at least four nuclear carbon atoms in each aromatic nucleus. Instead of using the free acids or the free diols, ester-forming derivatives may be used, as for example the esters of the acids with simple volatile monohydroxy compounds such as methyl or ethyl alcohol, or, as already indicated, the acetates in the case of diphenols.

While such high-melting crystalline aromatic polyesters, if of sufficiently high molecular weight, are capable of forming very valuable filaments which can be drawn to fibres of high strength and good properties, difficulties have arisen in the dyeing of such products. It is found that, due to the high degree of crystallisation of such polymers, entry of dyestuff molecules is either completely inhibited or is very difficult and has to be carried out under swelling conditions. This lack of affinity applies not only to the dyestuffs applied to natural fibres, for example the substantive cotton colours, acid wool dyestuffs and vat colours, but also to the dispersed insoluble colours which were developed for the dyeing of cellulose acetate artificial silk. This presents a serious disadvantage in the commercial application of these polymers.

We have found that the affinity of these polyesters and similar aromatic polyesters may be increased, particularly for acid wool dyestuffs, by replacing part of the diol or part of the dicarboxylic acid or part of the hydroxycarboxylic acid in the polymer by a diol or dicarboxylic acid or hydroxy-carboxylic acid containing one or more tertiary nitrogen atoms either in the chain joining the hydroxyl or carboxyl groups or as a side chain to the main chain joining such groups. Particularly important for this purpose are the bis-($\omega$-hydroxyalkyl)-alkylamines, arylamines or aralkylamines, for example bis-($\beta$-hydroxyethyl)-methylamine, bis-($\beta$-hydroxyethyl)-ethylamine, bis-($\beta$-hydroxyethyl)-benzylamine, and bis-($\beta$-hydroxyethyl)-aniline and bis-($\gamma$-hydroxypropyl)-aniline. Other hydroxyalkyl groups may be present in such bases, for example $\delta$-hydroxybutyl groups, but preferably the alkyl chain joining the hydroxy groups is as short as possible. Again we may use dicarboxylic acids containing a tertiary nitrogen atom either in the main chain joining the carboxy groups or attached to that chain, for example bis-($\omega$-carboxyalkyl)-alkylamines, arylamines or aralkylamines, or $\alpha.\alpha'$-bis-(dialkylamino)-dicarboxylic acids. As examples of reagents in which the tertiary amino group is attached to the main chain, $\gamma$-dimethylaminopropylene glycol, $\alpha$-dimethylamino-glutaric acid, $\alpha.\alpha'$-bis-(diethylamino)-adipic acid, $\alpha.\alpha'$-bis-(diethylamino)-pimelic acid and $\alpha.\alpha'$-bis-(diethylamino)-suberic acid may be mentioned.

It is not necessary for the purpose of the present invention to have a high proportion of the reagent containing the tertiary nitrogen atom. Indeed it is advantageous to limit the proportion. Thus in the case of using components containing a single tertiary nitrogen atom the proportion should be limited to less than 15 and preferably less than 10 molar percent on the weight of the total dicarboxylic acid used in the production of the polyester. Proportions of 4–7 molar percent are usually adequate. With components containing more than one tertiary nitrogen atom the above proportions should be divided by the number of tertiary nitrogen atoms in the component. Thus when using a component containing two tertiary nitrogen atoms the proportion is preferably less than 5 molar percent on the weigh of the total dicarboxylic acid used, and proportions of 2–3½ molar percent usually suffice. Calculated in terms of the nitrogen content of the resulting polymer, it is advantageous to limit the nitrogen content to less than 1% and preferably less than 0.6%, and proportions of the order of 0.25–0.45 are usually adequate.

In selecting the reagent containing the tertiary nitrogen atom, care should be exercised to avoid the use of compounds which under the reaction conditions tend to form cyclic compounds either with themselves or with other reagents present. However, in some cases, even where the constitution of the compound suggests that the reagent containing the tertiary nitrogen atom might form a cyclic compound by intramolecular reaction, this does not happen during polyesterification, or at least happens to a very limited extent. Such is the case, for example, with bis-$\beta$-hydroxyethyl-aniline, which might react with itself to produce phenyl morpholine. If a cyclic compound which can so be formed is volatile under the reaction conditions, the desired reaction is not inhibited (e. g. by limitation of the molecular weight attained) but a larger quantity of the reagent containing the tertiary nitrogen atom may be necessary to compensate for the volatilisation from the reaction mixture of such a volatile cyclic compound.

It has been found that by the use of such relatively small quantities of reagents containing a tertiary nitrogen atom the crystallinity of the polymer is sufficiently broken up to give points of entry for the dyestuff molecules while the basic character of the polymer naturally promotes affinity for the acid wool colours and at the same time the melting point of the polymer is not depressed to a value which is too low for general textile purposes.

The polyesters may be produced by the usual polyesterification methods using either the free diols and free carboxylic acids or their ester-forming equivalents. Preferably the acids are used in the form of their simple esters, such as the methyl or ethyl esters. Phenolic compounds are best used in the form of their acetates or formates or together with acetic anhydride or formic acid.

The condensation can generally be effected by heating the components to temperatures of the order of 180–360° C. and preferably at 200–280 or 300° C. Catalysts may be used to facilitate the reaction, for example acid catalysts such as para-toluene sulphonic acid or a trace of phosphoric acid in the case of condensing a free dicarboxylic acid with a diol or its formate or acetate or ester-interchange catalysts such as alkali metals, alkali metal alcoholates, magnesium ribbon or the like to promote reaction between simple esters of the dicarboxylic acids and the diols. When a volatile by-product is produced such as water, an alcohol or a phenol, it is of advantage to conduct the reaction, at least in its later stages, in vacuo and especially under an extremely low pressure. In addition the condensations are preferably carried out in an atmosphere substantially free from oxygen, for example an atmosphere of hydrogen or nitrogen. A stream of such an inert gas may be passed over or through the reaction mixture.

The condensations are best effected with the reagents and their products of reaction in the molten state, though they may if desired be carried out in a solvent medium which is liquid at the reaction temperature.

The invention is particularly directed to the production of polymers which are of sufficiently high molecular weight to be capable of forming filaments, and especially filaments which can be cold drawn. To this end, except in the case of using a reagent which is volatilised under the reaction conditions, e. g. a volatile glycol, the reagents should be used in such proportions that the complementary hydroxy and carboxy groups (or their ester-forming derivatives) are present in the reaction mixture in substantially equivalent amounts and the reaction is continued until the desired high molecular weight is achieved. Generally in the case of using non-volatile reagents the amounts should be equivalent within 5% and preferably within less than 2%, e. g. ½–1%. In polyesterifications involving volatile glycols, the glycol may be used in excess and allowed to evaporate as the condensation proceeds.

The following examples illustrate the invention:

*Example 1*

38.8 parts of dimethyl terephthalate, 18 parts of ethylene glycol (1.5 molecular proportions on the terephthalate) and 1.81 parts by weight of N.N-di-(β-hydroxyethyl)-aniline (5 molar percent on the terephthalate) were mixed together with a small quantity of an ester-interchange catalyst, namely sodium methoxide, in methanol together with some magnesium ribbon, and slowly heated under reflux to a temperature of 180° C. This temperature was maintained for 2 hours and the mixture was then raised to 220° C. for a further hour. At this stage the melt was very pale greenish yellow but the mixture on solidification was almost white. The condenser was removed and heating continued at 220° C. for a further 3 hours and at 260° C. for 4 hours. At this stage the product was fibre-forming and had a melting point of 234–240° C. The product was then further heated at 260° C. under an absolute pressure of 3 mm. of mercury for another 5 hours. The polymer was then a good fibre-forming product. Its melting point was 236–8° C. Its nitrogen content was determined at 0.34%. This corresponds very closely with the 5 molar percent of the di-β-hydroxyethylaniline originally used, so that very little volatilisation had occurred. The polymer had a good affinity for acid wool colours and could be dyed satisfactorily with the dispersed insoluble colours used for the dyeing of cellulose acetate artificial silk.

As a check on the absence of volatilisation of the di-β-hydroxyethyl-aniline, a trial was carried out in which sufficient di-β-hydroxyethyl-aniline was used to combine with all the terephthalate. In this check, 19.4 parts of dimethyl terephthalate, 18.1 parts of N.N-di-β-hydroxyethyl-aniline, 4.2 parts of ethylene glycol and the ester-interchange catalyst were heated under a short air condenser for 2 hours at 150–170° C. and then at 280° C. for 7 hours. Finally the polymer was heated for a further 5 hours at the same temperature under an absolute pressure of 0.5 mm. The product was not a crystalline polymer though it did give fibres. It had a nitrogen content of 4.29%, which is in close agreement with that required for the infinite polymer from terephthalic acid and the di-hydroxyethyl-aniline, showing that the ethylene glycol had volatilised and practically none of the tertiary nitrogen compound.

*Example 2*

Further trials were carried out exactly as described in Example 1 but using 1 molar percent, 3 molar percent and 10 molar percent of the di-hydroxyethyl-aniline. All the products were fibre-forming though the last product, using 10%, appeared to be only just crystalline. All the products had affinity for dyestuffs. The first product, using 1 molar percent of di-hydroxyethyl-analine, had a melting point of 244–246° C., the second product, using 3 molar percent, had a melting point of 245–247° C., while the last product, using 10 molar percent, had a melting point of about 230° C.

*Example 3*

43.29 parts of diethyl terephthalate, 18 parts of ethylene glycol (1.5 molar proportions on the total dicarboxylic acid) and 1.79 parts of α.α'-bis-(diethylamino)-pimelic acid diethyl ester (2½ molar percent on the total dicarboxylic acid) were mixed together as in Example 1 with a small quantity of ester-interchange catalyst and heated under reflux for 1 hour at 180° C. The temperature was then raised to 280° C. and maintained for 6 hours. Thereafter the temperature was maintained for a further 3 hours under an absolute pressure of 0.5 mm. of mercury. The resulting polymer was a good fibre-forming product and had affinity for acid wool dyestuffs. Its melting point was 235–240° C. and its nitrogen content 0.30–0.31%, which again corresponds closely with the 2½ molar percent used of the tertiary nitrogen compound.

Having described our invention, what we desire to secure by Letters Patent is:

1. A process for the production of high melting crystalline aromatic polyesters from a glycol and terephthalic acid, which comprises the step of carrying out the condensation of the free glycol and a simple ester of the terephthalic acid in the presence of N:N-di-(β-hydroxyethyl)-aniline in sufficient proportion to give a polymer having a nitrogen content of 0.25–0.45% by weight.

2. A high melting crystalline aromatic polyester having as the main structural unit ethylene terephthalate and having in its structure a N:N-di-(β-hydroxyethyl)- aniline residue in such a proportion that the nitrogen content is between 0.25 and 0.45%.

References Cited in the file of this patent

UNITED STATES PATENTS

| | | |
|---|---|---|
| 2,304,729 | Bruson | Dec. 8, 1942 |
| 2,551,731 | Drewitt et al. | May 8, 1951 |
| 2,647,104 | Shivers | July 28, 1953 |

OTHER REFERENCES

| | | |
|---|---|---|
| 572,671 | Great Britain | Oct. 18, 1945 |
| 597,783 | Great Britain | Feb. 3, 1948 |
| 609,792 | Great Britain | Oct. 6, 1948 |